United States Patent
Li

(10) Patent No.: US 12,362,595 B1
(45) Date of Patent: Jul. 15, 2025

(54) WIRELESS CHARGING DEVICE

(71) Applicant: Shenzhen Mgctech Co., Ltd., Shenzhen (CN)

(72) Inventor: Jiedan Li, Changde (CN)

(73) Assignee: SHENZHEN MGCTECH CO., LTD., Guangdong (CN)

( * ) Notice: Subject to any disclaimer, the term of this patent is extended or adjusted under 35 U.S.C. 154(b) by 0 days.

(21) Appl. No.: 19/027,206

(22) Filed: Jan. 17, 2025

(30) Foreign Application Priority Data

Dec. 12, 2024 (CN) .......................... 202423072025.0

(51) Int. Cl.
| | | |
|---|---|---|
| H01M 10/46 | (2006.01) | |
| H02J 7/00 | (2006.01) | |
| H02J 50/00 | (2016.01) | |
| H02J 50/10 | (2016.01) | |

(52) U.S. Cl.
CPC .......... H02J 50/005 (2020.01); H02J 7/0044 (2013.01); H02J 50/10 (2016.02)

(58) Field of Classification Search
CPC ...... H02J 7/0042; H02J 7/0044; H02J 50/005; H02J 50/10
USPC ................................ 320/107, 108, 114, 115
See application file for complete search history.

(56) References Cited

U.S. PATENT DOCUMENTS

2024/0178682 A1* 5/2024 Wu .......................... H02J 50/90

FOREIGN PATENT DOCUMENTS

| CN | 111478393 | A | * | 7/2020 |
|---|---|---|---|---|
| CN | 211063377 | U | * | 7/2020 |
| CN | 212063566 | U | | 12/2020 |
| CN | 113462158 | A | | 10/2021 |
| CN | 214543717 | U | | 10/2021 |
| CN | 216216093 | U | * | 4/2022 |
| CN | 115833405 | A | * | 3/2023 |
| CN | 117639173 | A | * | 3/2024 |
| CN | 221263433 | U | * | 7/2024 |

OTHER PUBLICATIONS

Machine translate of CN 221263433U (Jul. 2, 2024) (Year: 2024).*

* cited by examiner

*Primary Examiner* — Edward Tso
(74) *Attorney, Agent, or Firm* — Ming Jiang; OPENPTO US LLC

(57) ABSTRACT

Disclosed is a wireless charger, which includes: a main housing, a rotary seat, a rotary support seat, and a first electric mechanism. A top surface of the rotary seat is a flat surface and serves as a top wireless charging surface, and a lower portion of the rotary seat is hemispherical and is mounted in a hemispherical groove of the main housing. The rotary support seat is mounted in the rotary seat, a support portion of the rotary support seat is fixedly connected with the main housing via a connecting piece passing through an arc-shaped hole, and a rotary portion of the rotary support seat is rotatably connected with the support portion and is fixedly connected with the rotary seat. The first electric mechanism is mounted in the main housing, and drives the rotary seat to rotate and adjust an inclination angle of the top surface of the rotary seat.

16 Claims, 5 Drawing Sheets

WIRELESS CHARGING DEVICE

CROSS-REFERENCE TO RELATED APPLICATIONS

The application claims priority to Chinese patent application No. 2024230720250, filed on Dec. 12, 2024, the entire contents of which are incorporated herein by reference.

TECHNICAL FIELD

The present disclosure relates to the technical field of chargers, and specifically, to a wireless charger.

BACKGROUND

With the rapid development of science and technology, a contact-based power transmission mode is increasingly unable to meet growing demands of modern society. As a convenient way of power transmission, wireless charging technology has gradually become a mainstream alternative to the traditional wired charging method. A wireless charger uses the principle of electromagnetic induction for charging, and its operation principle is similar to that of a transformer. A wireless charging system is generally composed of a transmitting end and a receiving end, wherein the transmitting end supplies power to a coil via a power supply, and generates an electromagnetic signal under the action of electric power; the coil at the receiving end then receives the electromagnetic signal and converts it into an electric current, thereby enabling the transmission of energy and the charging of a device.

The core advantage of wireless charging technology lies in its ability to transmit electric energy without physical contact, thereby eliminating the dependence on cables in the traditional charging method. By electromagnetic wave propagation, electrical energy can be transmitted over the air and efficiently utilized by the receiving end device. This technology not only improves user convenience, but also greatly improves the safety and lifespan of electrical equipment. The reduced reliance on wires minimizes the problems of cable aging and breakage.

Despite the convenience and innovation brought by wireless charging technology, existing wireless charging devices still face certain challenges. For example, many wireless charging devices have fixed charging surface (i.e. a receiving area for wireless charging) that cannot rotate. This design may limit user experience in specific scenarios, especially when a desktop space is limited or multiple devices are charged at the same time, a fixed position of the charging surface may lead to inconvenience in the placement of devices and reduced charging efficiency.

SUMMARY

To solve the foregoing technical problem in the prior art that a charging surface at the top of a wireless charging device cannot be rotated and adjusted, the present disclosure proposes a wireless charger.

The present disclosure adopts the following technical solutions.

A wireless charger is provided, which includes:

a main housing, a hemispherical groove being formed in a top surface of the main housing, and an arc-shaped gear hole being formed in the hemispherical groove;

a rotary seat, a top surface of the rotary seat being a flat surface and serving as a top wireless charging surface, a corresponding upper wireless charging assembly being arranged inside the rotary seat, a portion below a middle portion or a portion near and below the middle portion having a hemispherical outer contour and being mounted in the hemispherical groove of the main housing, an arc-shaped bottom rack being arranged on a lower portion of the rotary seat along the hemispherical outer contour, and a plurality of arc-shaped holes being formed, at intervals in parallel to the bottom rack, in the lower portion of the rotary seat;

a rotary support seat, mounted in the rotary seat and including a rotary portion and a support portion, the support portion being fixedly connected with the main housing via a connecting piece passing through the arc-shaped hole, the rotary portion being rotatably connected with the support portion and fixedly connected with the rotary seat;

a first electric mechanism, mounted in the main housing, a first drive gear of the first electric mechanism passing through the gear hole and being meshed with the bottom rack, and under the driving of the first electric mechanism, the rotary seat rotating back and forth along a direction parallel to the bottom rack to adjust an inclination angle of the top wireless charging surface of the rotary seat; and a printed circuit board (PCB), mounted in the main housing and electrically connected with the upper wireless charging assembly and the first electric mechanism.

Further, openings are respectively formed on two opposite sides of the main housing, a side box bracket is arranged in the main housing, side wireless charging assemblies are respectively mounted at positions in the openings on the two sides, bottoms of the side wireless charging assemblies are rotatably connected with the side box bracket, a second electric mechanism is further arranged in the main housing and drives the side wireless charging assemblies on the two sides to rotate and unfold through the link mechanism, so that wireless charging surfaces of the side wireless charging assemblies face upward.

The side box bracket includes:

a side box lower bracket, connected with the main housing, storage grooves facing the openings being respectively formed on two sides of the side box lower bracket, a side box pin capable of being inserted into a side surface of the side wireless charging assembly being arranged on a groove wall of the bottom of the storage groove, and the second electric mechanism being mounted on a front surface of the side box lower bracket; and a side box upper bracket, mounted on a back surface of the side box lower bracket, the first electric mechanism being mounted on the side box upper bracket, a movement gap for the link mechanism being formed between the side box upper bracket and the side box lower bracket, and the second electric mechanism driving the link mechanism to move up and down, thereby causing the side wireless charging assemblies to be stored and unfolded.

Further, the link mechanism includes:

a rack rod, including a vertical portion and a hook portion located at the bottom of the vertical portion, a rack meshed with a second drive gear of the second electric mechanism being arranged on a side surface of the vertical portion; and two connecting rods, one end of each of the two connecting rods being connected with a side of the hook portion, the other end being rotatably connected with the corresponding side wireless charging assembly, the bottoms of the side wireless charging assemblies extending downward and deflecting inward and rotatably connected with connecting seats of the connecting rods.

Further, the rotary seat includes:
a lower shell, in a hemispherical shape fitted with the hemispherical groove on the top surface of the main housing, the rotary portion being mounted in the lower shell;
an upper shell, in a spherical table shape, a bottom edge of the upper shell being connected with a top edge of the lower shell to form a mounting cavity, a top surface of the upper shell being a flat surface, and a plurality of ventilation holes being formed in the top surface; and
a cover plate, covering the top surface of the upper shell.

The upper wireless charging assembly includes:
a fan, mounted on the rotary seat, an air outlet surface of the fan facing upward and directly facing the ventilation holes; and
an upper coil, arranged in a pre-set annular groove on the top surface of the upper shell.

Further, an inclined surface is formed between the top surface of the main housing and a front side of the main housing, and the top surface of the rotary seat is flush with the inclined surface when the rotary seat is rotated to a maximum inclination angle.

Further, the bottom rack is arranged at a middle position of the bottom of the rotary seat, and the arc-shaped holes arranged at intervals in parallel to the bottom rack are respectively arranged at positions on two sides of the bottom rack at the bottom of the rotary seat.

Further, a wire passing pipe extending downward and being communicated with an interior of the rotary seat is arranged at the bottom of the rotary seat, and a strip-shaped wire passing hole corresponding to a movement path of the wire passing pipe is arranged in the hemispherical groove of the main housing.

Further, a bottom cover is arranged at the bottom of the main housing, the PCB is mounted in the bottom cover, and a wiring hole corresponding to the PCB is arranged on a side surface of the bottom cover.

Further, the first electric mechanism includes a motor support seat and a first drive motor, the motor support seat is connected with an inner top wall of the main housing, the first drive motor is connected with the motor support seat, and an output shaft of the first drive motor is drivingly connected with the first drive gear.

Further, a limiting block is arranged on the inner top wall of the main housing, a first limiting groove recessed upward is formed in a bottom wall of the limiting block, a second limiting groove recessed downward is formed in a top wall of the motor support seat, the first limiting groove and the second limiting groove together form a clamping position, and the first drive motor is clamped in the clamping position.

Further, the limiting block is of a hollow structure, a transverse reinforcing rib and a longitudinal reinforcing rib are respectively arranged on each two opposite side walls of the limiting block, and the transverse reinforcing rib is connected with the longitudinal reinforcing rib.

Further, an avoidance notch is formed in a top wall of the side box upper bracket, and is configured to accommodate the motor support seat of the first electric mechanism.

Further, an output shaft of the first electric mechanism and an output shaft of the second electric mechanism are perpendicular to each other.

Further, the second electric mechanism includes a second drive motor and a second drive gear arranged on an output shaft of the second drive motor, the second drive motor is mounted on the side box lower bracket, and the second drive gear is in a meshed connection with the link mechanism to drive the side wireless charging assemblies on the two sides to rotate and unfold.

Compared with the prior art, the present disclosure achieves the following beneficial effects. In the wireless charger of the present disclosure, an inclination angle of the top surface of the spherical rotary seat can be adjusted up to 60° under the driving of the electric mechanism. The side wireless charging assemblies on the two sides can rotate and unfold under the driving of the electric mechanism to unfold to a maximum angle of 90°, that is, the side wireless charging assemblies can be in a horizontal state for wireless charging electronic products such as a headset and a watch. Moreover, the side wireless charging assemblies can be collected into the side surfaces of the main housing when not in use. Therefore, the all-in-one wireless charger has a compact shape, and is convenient to carry.

BRIEF DESCRIPTION OF DRAWINGS

To more clearly describe the technical solutions in embodiments of the present disclosure or in the prior art, the following briefly introduces accompanying drawings required to be used in the descriptions of the embodiments or prior art. Apparently, the following descriptions are merely some of the embodiments of the present disclosure. Those of ordinary skill in the art may further obtain other accompanying drawings based on these accompanying drawings without involving any creative effort.

Among the drawings.

In the figures, 1: main housing; 11: bottom cover; 12: hemispherical groove; 13: opening; 14: limiting block; 141: first limiting groove; 2: rotary seat; 21: lower shell; 211: bottom rack; 212: wire passing pipe; 22: upper shell; 23: cover plate; 31: rotary portion; 32: support portion; 33: support pin; 41: motor support seat; 411: second limiting groove; 42: first drive motor; 43: first drive gear; 5: printed circuit board (PCB); 61: side box lower bracket; 62: side box upper bracket; 71: side box pin; 711: upper coil; 712: fan; 72: side wireless charging assembly; 81: rack rod; 82: connecting rod; 91: second drive motor; and 92: second drive gear.

DETAILED DESCRIPTION OF THE EMBODIMENTS

To make the technical problem to be solved by the present disclosure, the technical solutions, and the beneficial effects more clearly understood, the present disclosure will be further described below in detail with reference to the drawings and embodiments. The described specific embodiments herein are merely used for illustrating the present disclosure, rather than limiting the present disclosure.

The principle and structure of the present disclosure will be described below in detail with reference to the drawings and embodiments.

A charging surface (a receiving area for wireless charging) of a wireless charger is fixed and cannot rotate. This design limits the user experience in specific scenarios. For example, when a user is using a mobile phone while charging, the charging surface at the top of the wireless charger is preferably inclined to allow the user to watch and use the mobile phone easily. On the other hand, when the user needs to place the mobile phone directly for charging, the charging surface at the top of the wireless charger is preferably adjusted to a horizontal state to allow the user to place the mobile phone directly.

Therefore, the present disclosure proposes a wireless charger, provided with a rotary seat capable of adjusting an inclination angle of a charging surface at the top, to improve the user experience.

Figure 1:
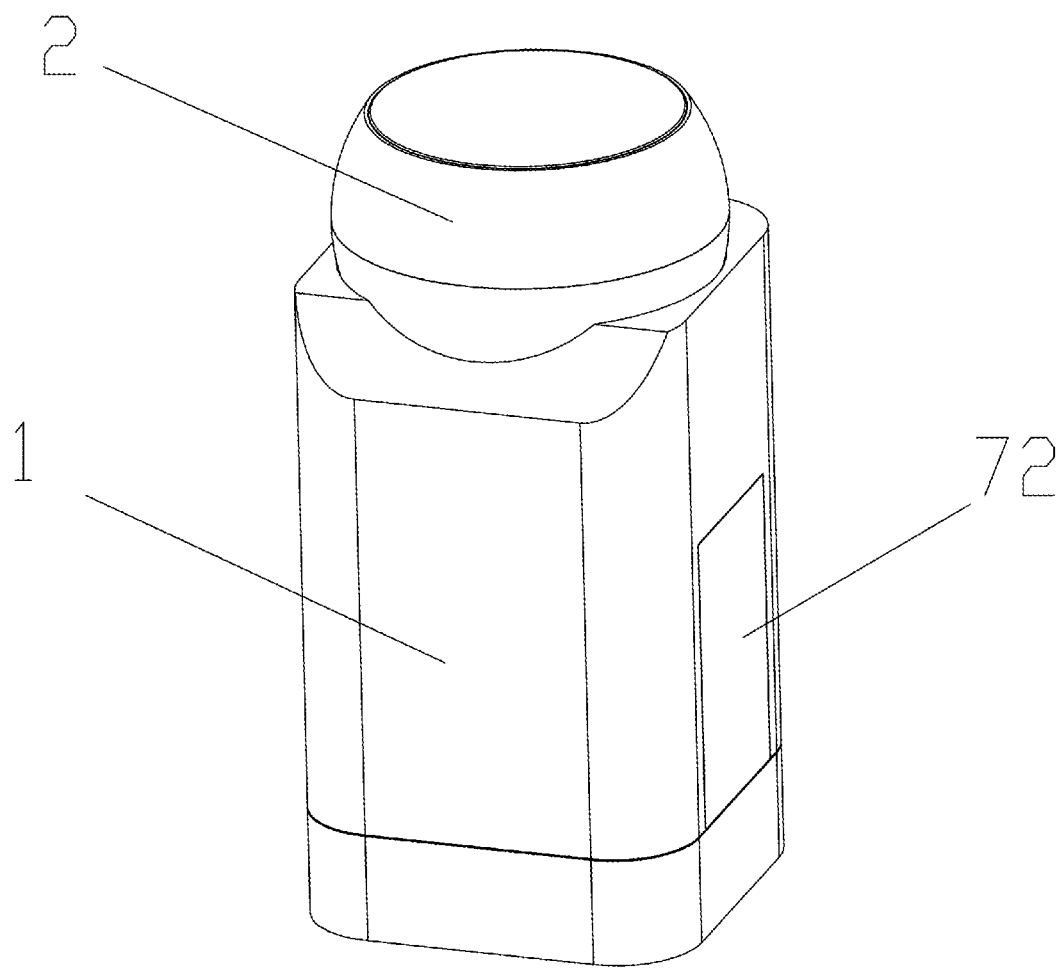
FIG. 1 is a schematic diagram of a stereochemical structure of a wireless charger in a storage state according to an embodiment of the present disclosure.
Figure 2:
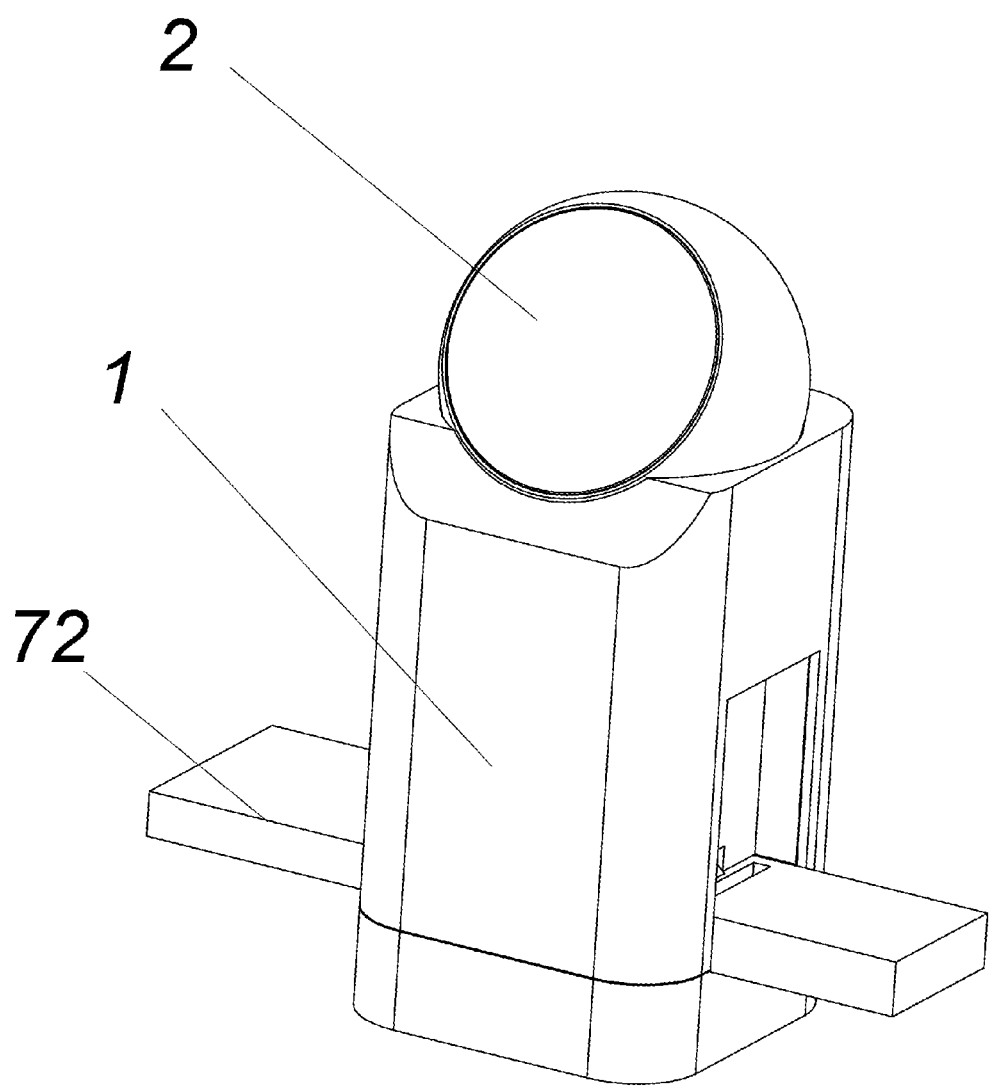
FIG. 2 is a schematic diagram of a stereochemical structure of a wireless charger in an unfolded state according to an embodiment of the present disclosure.
Figure 3:
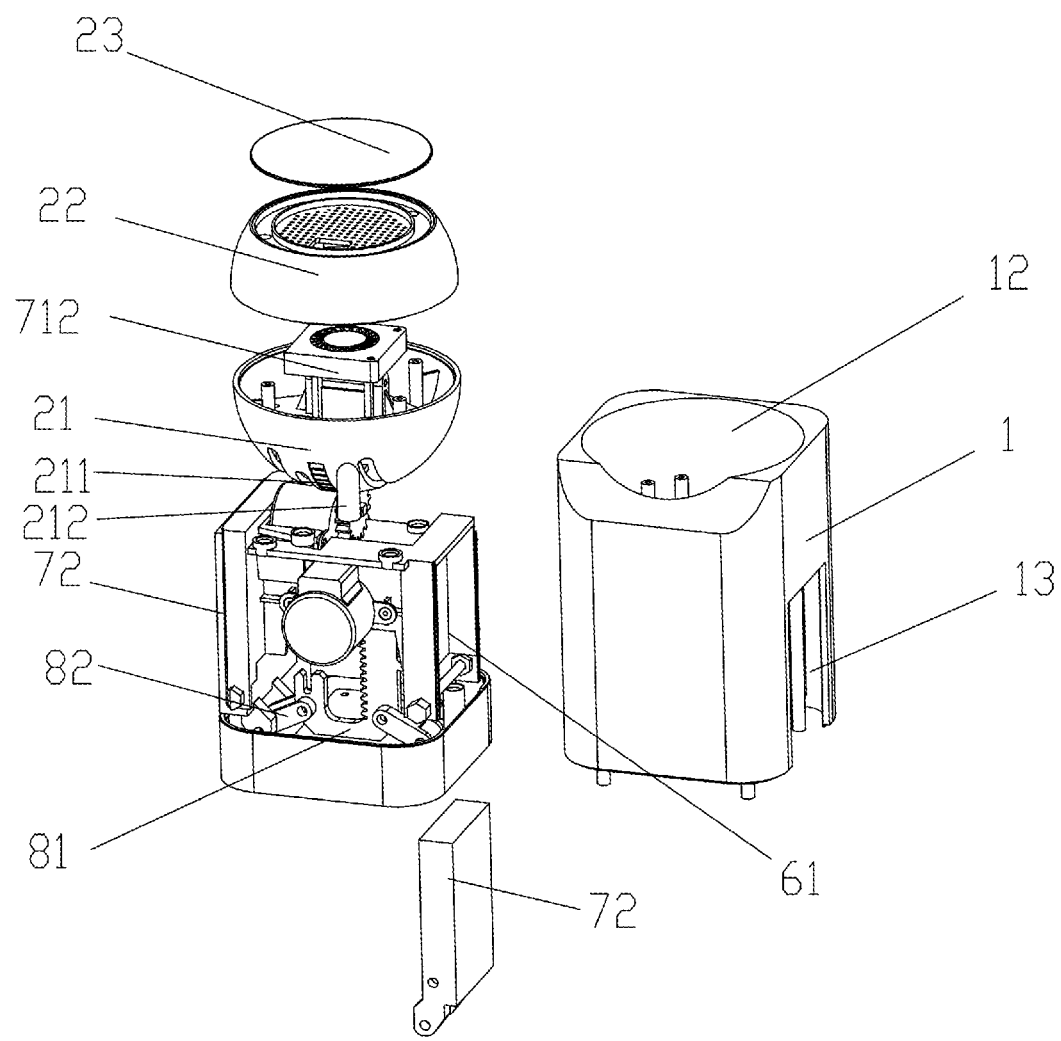
FIG. 3 is a semi-explosive view of a wireless charger according to an embodiment of the present disclosure.

As shown in FIG. 1 to FIG. 3, the wireless charger specifically includes: a main housing 1, a rotary seat 2, a rotary support seat, a first electric mechanism, and a printed circuit board (PCB) 5. The main housing 1 is cuboid. A hemispherical groove 12 is formed in a top surface of the main housing, and a gear hole is formed in the hemispherical groove 12. Because the gear hole is arranged along a groove wall of the hemispherical groove 12, the gear hole is arc-shaped. A top surface of the rotary seat 2 is a flat surface and serves as a top wireless charging surface. Moreover, an upper wireless charging assembly is correspondingly arranged inside the rotary seat 2. The upper wireless charging assembly is configured to charge an electronic product supporting wireless charging (such as a mobile phone) that is placed on the top wireless charging surface. A portion below a middle portion of the rotary seat 2 has a hemispherical outer contour, and a hemispherical bottom of the rotary seat 2 is fitted with the hemispherical groove 12 on the top surface of the main housing 1, that is, the rotary seat 2 can rotate in the hemispherical groove 12. An arc-shaped bottom rack 211 and a plurality of arc-shaped holes arranged at intervals in parallel to the bottom rack are arranged along the hemispherical outer contour of the hemispherical bottom of the rotary seat 2. The rotary support seat is mounted inside the rotary seat 2. The rotary seat 2 includes a rotary portion 31 and a support portion 32. The support portion 32 is connected (threaded connection) with a connecting pillar arranged in the hemispherical groove 12 of the main housing 1 via a connecting piece (specifically, may be a screw) directly passing through the arc-shaped hole. That is, during rotation of the rotary seat 2, the support portion 32 is in a fixed state. The rotary portion 31 is rotatably connected with the support portion 32 and is fixedly connected with a connecting pillar in the rotary seat 2 via a screw. During rotation of the rotary seat 2, the connecting piece between the support portion 32 and the main housing 1 can avoid the rotary seat 2 through the arc-shaped hole. The first electric mechanism is mounted in the main housing 1, and a first drive gear 43 of the first electric mechanism passes through the gear hole and is meshed with the bottom rack 211 of the rotary seat 2. Under the driving of the first electric mechanism, the first drive gear 43 can rotate forward and backward, to drive the rotary seat 2 to rotate back and forth along a direction parallel to the bottom rack so as to adjust the inclination angle of the top wireless charging surface of the rotary seat. The PCB 5 is mounted in the main housing 1, and is electrically connected with the upper wireless charging assembly and the first electric mechanism, to supply power to and control driving of the upper wireless charging assembly and the first electric mechanism.

Figure 4:
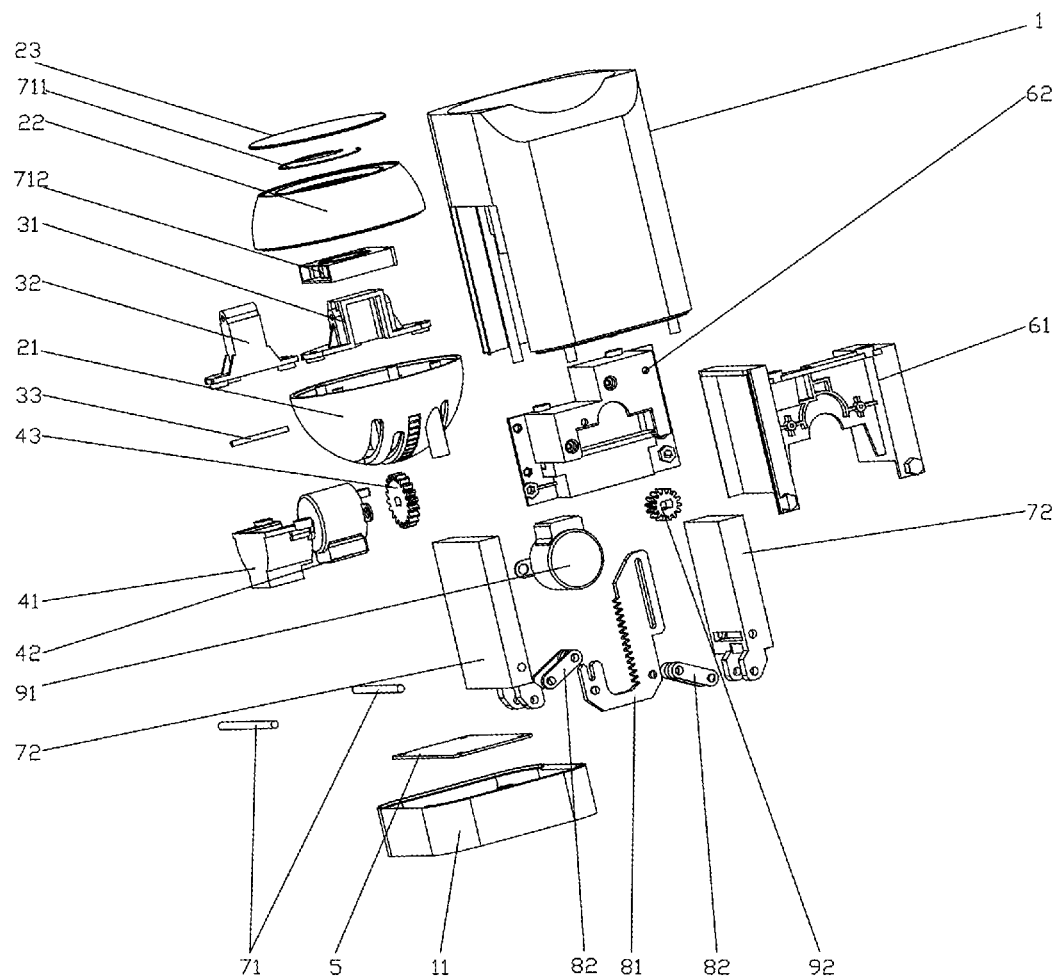
FIG. 4 is an explosive view of a wireless charger according to an embodiment of the present disclosure.
Figure 5:
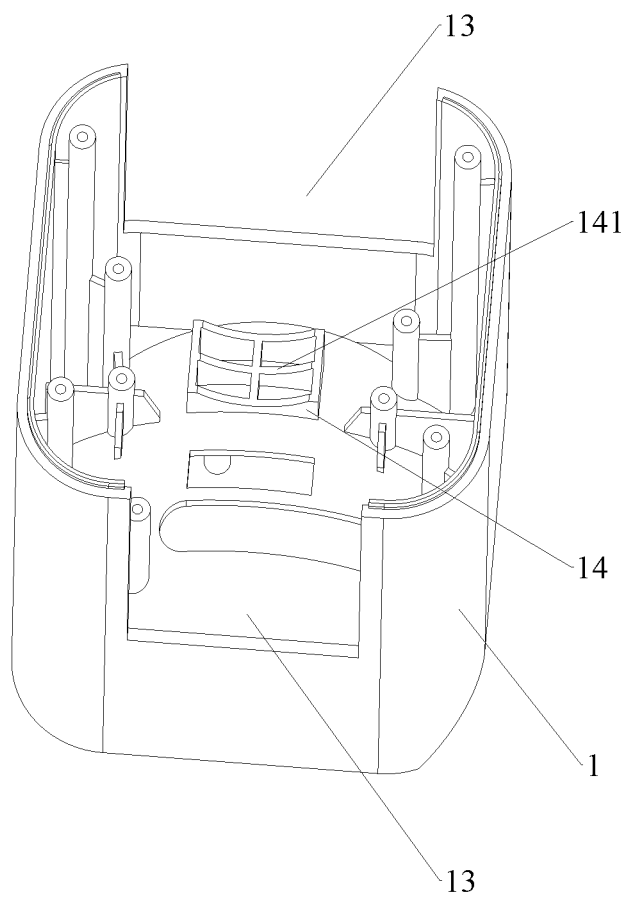
FIG. 5 is a schematic structural diagram of a main housing without a bottom cover according to an embodiment of the present disclosure.
Figure 6:
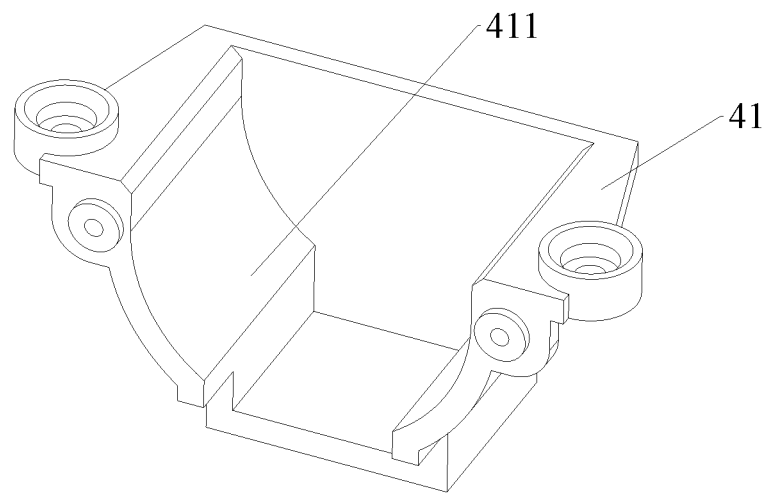
FIG. 6 is a schematic structural diagram of a motor support seat according to an embodiment of the present disclosure.

In a specific embodiment, as shown in FIG. 2 to FIG. 4, openings 13 are respectively formed on left and right sides (or front and back sides) of the main housing 1. A side box bracket is arranged in the main housing 1. Side wireless charging assemblies 72 are respectively mounted in the openings 13 on the two sides, and when stored, the side wireless charging assemblies 72 are in a vertical state and closely attached to two sides of the side box bracket. Bottoms of the side wireless charging assemblies 72 are rotatably connected with the side box bracket, so that the side wireless charging assemblies 72 can be flipped outward from a vertical storage state by taking the bottom as a rotation center, and unfolded, and the side wireless charging assemblies are close to an inner side surface of the side box bracket and face upward. That is, side wireless charging surfaces face upward. A second electric mechanism is further arranged in the main housing 1. The second electric mechanism drives the side wireless charging assemblies 72 on the two sides to flip outward and unfold via a link mechanism, so that the side wireless charging surfaces of the side wireless charging assemblies 72 on the two sides face upward, and to-be-charged electronic products can be placed onto the side wireless charging surfaces. In this design, the top wireless charging surface provided on the top surface of the wireless charger is configured to charge a larger electronic product such as a mobile phone or a tablet, and the side wireless charging surfaces on the two sides are configured to charge a smaller electronic product such as a watch or a headset.

In a further embodiment, the side box bracket includes: a side box lower bracket 61 and a side box upper bracket 62. A top surface of the side box lower bracket 61 is fixedly connected with an inner wall of the top surface of the main housing 1, storage grooves are respectively formed at positions, directly facing the openings 13, on two sides of the side box lower bracket 61, mounting holes are formed in groove walls of two opposite sides of the bottom of the storage groove, and a side box pin 71 (after the side box pin is mounted, components, such as nuts, may be mounted at two ends of the side box pin 71 to prevent the side box pin from falling out) passes through the mounting holes. When the side wireless charging assemblies 72 are mounted onto the side box lower bracket 61, the side box pin 71 passes through the mounting holes at the bottom of the storage groove and a pin hole reserved at the bottom of the side wireless charging assembly 72, so that the side wireless charging assembly 72 can be flipped outward around the side box pin 71 passing through the bottom of the side wireless charging assembly and unfolded, or can be flipped inward around the side box pin 71 passing through the bottom of the side wireless charging assembly and stored into the storage groove in the opening 13. The second electric mechanism is mounted on a middle portion of a front surface of the side box lower bracket 61. The side box upper bracket 62 is mounted on a middle portion of a back surface of the side box lower bracket 61. The first electric mechanism is mounted on the side box upper bracket 62. A movement gap for the link mechanism is formed between the side box upper bracket 62 and the side box lower bracket 61. The second electric mechanism drives the link mechanism to move up and down, thereby causing the side wireless charging assemblies 72 to be stored and unfolded.

Specifically, the link mechanism includes: a rack rod 81 and two connecting rods 82. The rack rod 81 includes a vertical portion and a hook portion located at the bottom of the vertical portion. The vertical portion is located in a mounting gap between the side box upper bracket and the side box lower bracket, and a rack that is meshed with the second drive gear 92 driven by the second electric mechanism is arranged on a side surface of the vertical portion, so that the second electric mechanism drives the second motor gear 92 to rotate forward and backward, thereby driving the rack rod 81 to move up and down. The two connecting rods 82 are connected with two sides of the hook portion at the bottom of the rack rod 81. One end of the connecting rod 82 is rotatably connected with the hook portion, and the other end of the connecting rod is rotatably connected with a corresponding side wireless charging assembly 72. Moreover, the bottoms of the side wireless charging assemblies 72 extend downward and deflect inward and are rotatably connected with the rotary seat, that is, the other end of the connecting rod 82 is rotatably connected with the rotary seat.

When the rack rod 81 moves downward, the connecting rod 82 push the two side wireless charging assemblies 72 to flip upward for storage by taking the side box pins at the bottoms of the side wireless charging assemblies as rotation axes. When the rack rod 81 moves upward, the connecting rod 82 pull the two side wireless charging assemblies 72 to flip downward for unfolding by taking the side box pins at the bottoms of the side wireless charging assemblies as rotation axes.

Specifically, the rotary seat 2 includes: a lower shell 21, an upper shell 22, and a cover plate 23. The lower shell 21 is in a hemispherical shape fitted with the hemispherical groove 12 on the top surface of the main housing 1. The rotary portion 31 is mounted in the lower shell 21 and is in a zigzag shape, and connecting edges on two sides of the rotary portion are connected with a connecting pillar that is arranged in the lower shell 21 and that provided with threaded holes via a screw. The support portion 32 is mounted below the rotary portion 31. A support pin 33 passes through upper portions of the rotary portion 31 and the support portion 32, so that the rotary portion 31 can rotate relative to the support portion 32. The upper shell 22 is in a spherical table shape, a bottom edge of the upper shell is connected with a top edge of the lower shell 21 to form a mounting cavity, a top surface of the upper shell is a flat surface, and a plurality of ventilation holes are formed in the top surface. Specifically, a plurality of connecting pillars that extend downward from an inner side of the top surface and that are provided with threaded holes are arranged in the upper shell 22. A screw passes through the connecting pillar from the top surface of the upper shell 22 and is in threaded connection with a connection pillar that is arranged in the lower shell 21 and that provided with a directly opposite threaded hole, so that the upper shell 22 and the lower shell 21 are completely fixed and closed. The cover plate 23 covers the top surface of the upper shell 22. Specifically, the cover plate is a glass cover plate 23, and has a decorative effect.

Further, the upper wireless charging assembly includes: a fan 712 and an upper coil 711. The fan 712 is mounted on the rotary seat 2, a top surface of the fan is an air outlet surface, and a side surface of the fan is an air inlet surface. Corresponding air inlet holes are formed in a side surface of the upper shell 22, a plurality of ventilation holes are formed in a top surface of the upper shell 22, and an annular groove is arranged around the periphery of the ventilation holes. The fan 712 can provide heat dissipation for a to-be-charged device on the top wireless charging surface. The upper coil 711 is arranged in the pre-set annular groove on the top surface of the upper shell 22.

In addition, the side wireless charging assembly 72 may further include a necessary component for wireless charging, such as a side coil, and as long as wireless charging can be realized. It is not the focus of the present disclosure, and a detailed description will not be made.

An inclined surface (perpendicular to a rotation direction of the rotary seat 2) is arranged between the top surface of the main housing 1 and a front side of the main housing 1. The top surface of the rotary seat 2 is flush with the inclined surface when the rotary seat rotates to a maximum inclination angle. When a to-be-charged device, such as a mobile phone, is placed on the top wireless charging surface, due to the inclined surface arranged on the main housing 1, the mobile phone cannot be placed normally when the rotary seat 2 is inclined, thereby avoiding convex interference on a surface housing wall of the main housing 1.

Specifically, the bottom rack is arranged in the middle position of the bottom of the rotary seat 2, and the arc-shaped holes arranged at intervals in parallel to the bottom rack 211 are respectively arranged at the positions on the two sides of the bottom rack 211 at the bottom of the rotary seat 2. Moreover, the connecting pillar with the threaded hole is arranged at a position, corresponding to the arc-shaped hole, in the hemispherical groove 12 of the main housing 1, and is configured to connect the screw of the support portion 32. The rack is arranged in the middle, and the connecting screws are arranged at positions on the two sides of the rack, so that the rotary seat 2 can rotate more stably.

In a specific embodiment, a wire passing pipe 212 that extends downward and that is communicated with the interior of the rotary seat 2 is arranged at the bottom of the rotary seat 2. A strip-shaped wire passing hole corresponding to a movement path of the wire passing pipe 212 is arranged in the hemispherical groove 12 of the main housing 1. That is, a connecting wire of the upper wireless charging assembly passes through the wire passing pipe 212, extends into the main housing 1, and is connected with the PCB 5, thereby avoiding direct friction between the connecting wire and an edge of the hole of the main housing 1 or leakage of the wire during rotation.

In a specific embodiment, a bottom cover 11 is arranged at the bottom of the main housing 1, the PCB 5 is mounted in the bottom cover 11, and a wiring hole corresponding to the PCB 5 is formed in a side surface of the bottom cover 11.

In addition, drive components of the first electric mechanism and the second electric mechanism are drive motors.

In a specific embodiment, as shown in FIG. 2 to FIG. 6, the first electric mechanism includes a motor support seat 41 and a first drive motor 42. The motor support seat 41 is connected with an inner top wall of the main housing 1, the first drive motor 42 is connected with the motor support seat 41, and an output shaft of the first drive motor 42 is drivingly connected with the first drive gear 43.

Further, a limiting block 14 is arranged on the inner top wall of the main housing 1, a first limiting groove 141 recessed upward is formed in a bottom wall of the limiting block 14, a second limiting groove 411 recessed downward is formed in a top wall of the motor support seat 41, the first limiting groove 141 and the second limiting groove 411 together form a clamping position, and the first drive motor 42 is clamped in the clamping position. Specifically, the first limiting groove 141 is an arc-shaped groove, and the second limiting groove 411 is a special-shaped groove formed by forming a square groove in a bottom wall of the arc-shaped groove. The square groove is configured to accommodate a bottom seat of the first drive motor 42. A main body of the first drive motor 42 is placed into two arc-shaped grooves, to limit the position of the first drive motor 42.

Further, the limiting block 14 is of a hollow structure, a transverse reinforcing rib and a longitudinal reinforcing rib are respectively arranged on each two opposite inner side walls of the limiting block 14, and the transverse reinforcing rib is connected with the longitudinal reinforcing rib. The limiting block 14 is of hollow design, which is beneficial to saving the consumables of the main housing 1, reducing the weight of the main housing 1, and making the wireless charger more portable. Furthermore, the transverse reinforcing rib and the longitudinal reinforcing rib are arranged in the limiting block 14, which can ensure the structural stability of the limiting block 14 while reducing the weight.

Specifically, an avoidance notch is formed in the top wall of the side box upper bracket 62, and is configured to accommodate the motor support seat of the first electric mechanism.

In a further embodiment, an output shaft of the first electric mechanism and an output shaft of the second electric mechanism are perpendicular to each other, and are respectively configured to drive the top wireless charging surface and the side wireless charging assembly to rotate in different directions.

In a further embodiment, the second electric mechanism includes a second drive motor 91 and a second drive gear 92 arranged an output shaft of the second drive motor 91. The second drive motor 91 is mounted on the side box lower bracket 61, and the second drive gear 92 is in meshed connection with the link mechanism to drive the side wireless charging assemblies 72 at the two sides to rotate and unfold.

The rotatory connection is realized via a pin passing through two connecting pieces, that is, the two connecting pieces rotate with the pin as a connecting shaft.

The foregoing used terms are merely used for describing specific implementations, are not intended to limit exemplary implementations according to the present disclosure. Unless otherwise specified, as used herein, a singular form is intended to include a plural form. In addition, the terms "include" and/or "comprise" used herein indicate the presence of features, steps, operations, devices, components and/or combinations thereof.

Unless otherwise specified, a relative arrangement, numerical expressions, and numerical values of components and steps described in these embodiments do not limit the scope of the present disclosure. Furthermore, for the convenience of description, sizes of various parts shown in the drawings are not drawn according to the actual proportional relationship. Technologies, methods, and devices known to those of ordinary skill in the art may not described in detail. However, where appropriate, such technologies, methods, and devices are considered part of the authorization description. In all the examples described and discussed herein, any specific value is interpreted as merely exemplary and not as limiting. Therefore, other examples of the exemplary embodiments may have different values. Like reference numbers and letters refer to similar items in the following drawings, so once an item is defined in one drawing, it does not require further discussion in subsequent drawings.

In the description of the present disclosure, the directions or positional relationships indicated by directional words such as "front, rear, up, down, left, and right", "lateral, vertical, perpendicular, and horizontal", and "top and bottom" are usually based on the directions or positional relationships shown in the drawings. They are only for the convenience of describing the present disclosure and simplifying the description. Unless otherwise specified, these directional words do not indicate or imply that devices or elements referred to must have a specific direction or be constructed and operated in a specific direction. Therefore, they cannot be understood as limiting the scope of protection of the present disclosure. The directional words "inside and outside" refer to the inside and outside relative to a contour of each component.

In addition, the use of terms such as "first" and "second" to limit components is only for the convenience of distinguishing the corresponding components. Unless otherwise specified, the above terms have no special meaning and therefore cannot be understood as limiting the scope of protection of the present disclosure.

The above is merely preferred embodiments of the present disclosure, and is not intended to limit the present disclosure. Those skilled in the art may make various modifications and changes to the present disclosure. Any modification, equivalent substitution, improvement, or the like made within the spirit and principle of the present disclosure shall fall within the scope of protection of the present disclosure.

What is claimed is:

1. A wireless charger, comprising:
a main housing (1), a hemispherical groove (12) being formed in a top surface of the main housing (1), and an arc-shaped gear hole being formed in the hemispherical groove (12);
a rotary seat (2), a top surface of the rotary seat (2) being a flat surface and serving as a top wireless charging surface, a corresponding upper wireless charging assembly being arranged inside the rotary seat (2), a portion below a middle portion or a portion near and below the middle portion having a hemispherical outer contour and being mounted on the hemispherical groove (12) of the main housing (1), an arc-shaped bottom rack (211) being arranged on a lower portion of the rotary seat (2) along the hemispherical outer contour, and a plurality of arc-shaped holes being formed, at intervals in parallel to the bottom rack (211), in the lower portion of the rotary seat (2);
a rotary support seat, mounted in the rotary seat (2) and comprising a rotary portion (31) and a support portion (32), the support portion (32) being fixedly connected with the main housing (1) via a connecting piece passing through the arc-shaped hole, and the rotary portion (31) being rotatably connected with the support portion (32) and fixedly connected with the rotary seat (2);
a first electric mechanism, mounted in the main housing (1), a first drive gear (43) of the first electric mechanism passing through the gear hole and being meshed with the bottom rack (211), and the rotary seat (2) rotating back and forth in a direction parallel to the bottom rack (211) under the driving of the first electric mechanism to adjust an inclination angle of the top wireless charging surface of the rotary seat (2); and a printed circuit board (PCB) (5), mounted in the main housing (1) and electrically connected with the upper wireless charging assembly and the first electric mechanism.

2. The wireless charger according to claim 1, wherein openings (13) are respectively formed on two opposite sides of the main housing (1), a side box bracket is arranged in the main housing (1), side wireless charging assemblies (72) are respectively mounted at positions in the openings (13) on the two sides, the bottoms of the side wireless charging assemblies (72) are rotatably connected with the side box bracket, a second electric mechanism is further arranged in the main housing (1), and the second electric mechanism drives the side wireless charging assemblies (72) on the two sides to rotate and unfold via a link mechanism, so as to enable wireless charging surfaces of the side wireless charging assemblies (72) on the two sides to face upward.

3. The wireless charger according to claim 2, wherein the side box bracket comprises:
 a side box lower bracket (61), fixedly connected to the main housing (1), storage grooves, directly facing the openings (13), being respectively formed on two sides of the side box lower bracket (61), a side box pin (71) capable of being inserted into a side surface of the side wireless charging assembly (72) being arranged on a groove wall at the bottom of the storage groove, and the second electric mechanism being mounted on the front surface of the side box lower bracket (61); and
 a side box upper bracket (62), mounted on a back surface of the side box lower bracket (61), the first electric mechanism being mounted on the side box upper bracket (62), a movement gap for the link mechanism being formed between the side box upper bracket (62) and the side box lower bracket (61), and the second electric mechanism driving the link mechanism to move up and down, thereby causing the side wireless charging assemblies (72) to be stored and unfolded.

4. The wireless charger according to claim 3, wherein the link mechanism comprises:
 a rack rod (81), comprising a vertical portion and a hook portion located at the bottom of the vertical portion, a rack meshed with a second drive gear (92) driven by the second electric mechanism being arranged on a side surface of the vertical portion; and
 two connecting rods (82), one end of each of the two connecting rods (82) being rotatably connected with a side of the hook portion, and the other end being rotatably connected with the corresponding side wireless charging assembly (72), and the bottoms of the side wireless charging assemblies (72) extending downward and deflecting inward and rotatably connected with connecting seats of the connecting rods (82).

5. The wireless charger according to claim 1, wherein the rotary seat (2) comprises:
 a lower shell (21), in a hemispherical shape fitted with the hemispherical groove (12) on the top surface of the main housing (1), the rotary portion (31) being mounted in the lower shell (21);
 an upper shell (22), in a spherical table shape, a bottom edge being connected with a top edge of the lower shell (21) to form a mounting cavity, a top surface being a flat surface, and a plurality of ventilation holes being formed in the top surface; and
 a cover plate (23), covering the top surface of the upper shell (22).

6. The wireless charger according to claim 5, wherein the upper wireless charging assembly comprises:
 a fan (712), mounted on the rotary seat (2), an air outlet surface of the fan (712) facing upwards and directly facing the ventilation holes; and
 an upper coil (711) arranged in a pre-set annular groove on the top surface of the upper shell (22).

7. The wireless charger according to claim 1, wherein an inclined surface is arranged between the top surface of the main housing (1) and a front side of the main housing (1), and the top surface of the rotary seat (2) is flush with the inclined surface when the rotary seat (2) is rotated to a maximum inclination angle.

8. The wireless charger according to claim 1, wherein the bottom rack (211) is arranged at a middle position of the bottom of the rotary seat (2), and the arc-shaped holes arranged at intervals in parallel to the bottom rack (211) are respectively arranged at positions on two sides of the bottom rack (211) at the bottom of the rotary seat (2).

9. The wireless charger according to claim 1, wherein a wire passing pipe (212) extending downward and communicated with an interior of the rotary seat (2) is arranged at the bottom of the rotary seat (2), and a strip-shaped wire passing hole corresponding to a movement path of the wire passing pipe (212) is arranged in the hemispherical groove (12) of the main housing (1).

10. The wireless charger according to claim 1, wherein a bottom cover (11) is arranged at the bottom of the main housing (1), the PCB (5) is mounted in the bottom cover (11), and a wiring hole corresponding to the PCB (5) is arranged on a side surface of the bottom cover (11).

11. The wireless charger according to claim 1, wherein the first electric mechanism comprises a motor support seat (41) and a first drive motor (42), the motor support seat (41) is connected with an inner top wall of the main housing (1), the first drive motor (42) is connected with the motor support seat (41), an output shaft of the first drive motor (42) is drivingly connected with the first drive gear (43).

12. The wireless charger according to claim 11, wherein a limiting block (14) is arranged on the inner top wall of the main housing (1), a first limiting groove (141) recessed upward is formed in a bottom wall of the limiting block (14), a second limiting groove (411) recessed downward is formed in a top wall of the motor support seat (41), the first limiting groove (141) and the second limiting groove (411) together form a clamping position, and the first drive motor (42) is clamped in the clamping position.

13. The wireless charger according to claim 12, wherein the limiting block is a hollow structure, and a transverse reinforcing rib and a longitudinal reinforcing rib are respectively arranged on each two opposite inner side walls of the limiting block (14), and the transverse reinforcing rib is connected with the longitudinal reinforcing rib.

14. The wireless charger according to claim 3, wherein an avoidance notch is formed in a top wall of the side box upper bracket (62), and is configured to accommodate the motor support seat of the first electric mechanism.

15. The wireless charger according to claim 2, wherein an output shaft of the first electric machine and an output shaft of the second electric machine are perpendicular to each other.

16. The wireless charger according to claim 3, wherein the second electric mechanism comprises a second drive motor (91) and a second drive gear (92) mounted an output shaft of the second drive motor (91), the second drive motor (91) is mounted on the side box lower bracket (61), and the second drive gear (92) is in a meshed connection with the link mechanism to drive the side wireless charging assemblies (72) on the two sides to rotate and unfold.

\* \* \* \* \*